United States Patent
Abe et al.

(10) Patent No.: US 6,865,361 B2
(45) Date of Patent: Mar. 8, 2005

(54) TRANSFER BELT UNIT AND IMAGE FORMING APPARATUS USING THE SAME

(75) Inventors: Nobumasa Abe, Nagano-Ken (JP); Tomoe Aruga, Nagano-Ken (JP); Yujiro Nomura, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 10/286,974

(22) Filed: Nov. 4, 2002

(65) Prior Publication Data

US 2003/0091373 A1 May 15, 2003

(30) Foreign Application Priority Data

Nov. 12, 2001 (JP) .......................................... 2001-345740
Nov. 12, 2001 (JP) .......................................... 2001-345741

(51) Int. Cl.$^7$ .......................... G03G 15/16; G03G 21/00
(52) U.S. Cl. .................... 399/302; 399/101; 399/121
(58) Field of Search .................... 399/101, 121, 399/123, 162, 165, 302, 303, 308, 313, 107

(56) References Cited

U.S. PATENT DOCUMENTS

| | | | | |
|---|---|---|---|---|
| 5,258,816 A | * | 11/1993 | Haneda et al. | 399/165 |
| 5,587,769 A | * | 12/1996 | Sawada et al. | 399/101 X |
| 6,324,374 B1 | * | 11/2001 | Sasamoto et al. | 399/101 X |
| 6,377,771 B1 | * | 4/2002 | Verluyten et al. | 399/302 |
| 6,615,015 B2 | * | 9/2003 | Nakazawa et al. | 399/302 |
| 6,661,987 B2 | * | 12/2003 | Hiroki | 399/302 X |
| 6,704,528 B1 | * | 3/2004 | Kawamura et al. | 399/123 |
| 2001/0031159 A1 | * | 10/2001 | Ogiyama et al. | 399/101 X |
| 2002/0057931 A1 | * | 5/2002 | Oikawa | 399/302 X |
| 2003/0086732 A1 | * | 5/2003 | Abe et al. | 399/302 X |
| 2003/0086738 A1 | * | 5/2003 | Sakanobe et al. | 399/350 |
| 2003/0147678 A1 | * | 8/2003 | Ozawa et al. | 399/302 |

FOREIGN PATENT DOCUMENTS

| | | | |
|---|---|---|---|
| JP | 05-289426 | * | 11/1993 |
| JP | 2000-330395 | * | 11/2000 |
| JP | 2001-075374 | * | 3/2001 |
| JP | 2002-132057 | * | 5/2002 |

* cited by examiner

*Primary Examiner*—Sophia S. Chen
(74) *Attorney, Agent, or Firm*—Sughrue Mion, PLLC

(57) ABSTRACT

A transfer belt unit and image forming apparatus that achieves the reduction in size and cost of a transfer belt unit and can prevent fluctuation of the cleaning performance. The unit has a transfer belt, a plurality of rollers around which the transfer belt is laid with certain tension, wherein at least one of the rollers is a tension roller for tensioning to the transfer belt; frames supporting the plurality of rollers; tensioning mechanisms which are disposed on the side faces of the frames to bias the tension roller in a belt tensioning direction; a cleaning mechanism in contact with the transfer belt at a position opposing the tension roller; rotation preventing members which prevent the rotational torque form being transmitted to the cleaning mechanism; and position restricting members which restrict the relative position between the cleaning mechanism and the tension roller.

8 Claims, 10 Drawing Sheets

TRANSFER BELT UNIT AND IMAGE FORMING APPARATUS USING THE SAME

BACKGROUND OF THE INVENTION

The present invention relates to a tandem-type image forming apparatus in which image forming stations for respective colors are arranged along a transfer belt, each image forming station being composed of an image carrier, a charging means and a developing means which are arranged around the image carrier. The image forming apparatus forms a multi-color image by passing the transfer belt through every station.

Tandem-type image forming apparatuses as described above are categorized into two types as:

(1) an apparatus employing a paper delivery method which comprises a plurality of image forming stations arranged in an array, in which a receiving medium is electrostatically attracted to a delivery belt and is fed to be brought in contact with the respective stations in order and electrostatic transferring force is applied between each station and the recording medium, thereby superposing toner images of plural colors while directly transferring the toner images to the receiving medium; and (2) an apparatus employing an intermediate transfer method which comprises a plurality of image forming stations arranged in an array, in which an intermediate transfer belt made of a dielectric substance is fed to be brought in contact with the respective stations and electrostatic transferring force is applied between each station and the intermediate transfer belt so as to transfer primarily toner images of the respective stations one by one to superpose the toner images on the intermediate transfer belt and the superposed toner images are transferred secondarily from the intermediate transfer belt to a recording medium at once.

In the aforementioned paper delivery method, it is required to provide a means (roller or brush) for attracting the receiving medium to the delivery belt and high voltage power supply. In the intermediate transfer method, however, such a means and high voltage power supply are not required. Further, in the paper delivery method, it is required to strictly control the transfer bias to be applied to respective image transferred portions according to the size, the thickness, and the kind of the receiving medium. In the intermediate transfer method, the primary transfer of toner images is conducted to the intermediate transfer belt of which resistance, thickness, and surface roughness are constant regardless of the aforementioned factors of the receiving medium. The control of the transfer condition including the transfer voltage or transfer current and contact pressure must be conducted only for the secondary transfer of the toner images to the receiving medium. Therefore, the intermediate transfer method has a lot of advantages.

It is required to provide a cleaning means for removing toner remaining on the surface of the transfer belt after the transfer. Normally, a back-up roller is disposed on the back of the transfer belt to oppose a cleaning blade as the cleaning means. If using a belt tension roller as the back-up roller, the reduction in size and cost of the apparatus can be achieved. However, since the position of the belt tension roller is not constant because of allowable error in length of the transfer belt and allowable variance in tension, the contact position of the cleaning blade is varied and the cleaning performance is therefore not stable.

The first object of the present invention is therefore to provide a transfer belt unit and an image forming apparatus using the same, capable of resolving the aforementioned conventional problems, which can achieve the reduction in size and cost and can prevent the cleaning performance from being varied.

In the both cases of the intermediate transfer method and the paper delivery method, there is another problem that the accuracy of color registration may be deteriorated due to meandering of the intermediate transfer belt or the paper delivery belt (hereinafter, both referred to as "transfer belt"). The meandering of the transfer belt results from difference in peripheral length between both sides of the transfer belt or variation in material of belt which may be generated in the manufacturing process, or parallelism between a driving roller and a driven roller for the transfer belt.

Though various devices for controlling the meandering of the belt have been proposed, any of them is complex in structure.

The second object of the present invention is therefore to provide a transfer belt unit and an image forming apparatus using the same, capable of resolving the aforementioned conventional problems, which can prevent the meandering of a transfer belt with a simple structure.

SUMMARY OF THE INVENTION

For achieving the aforementioned first object, a transfer belt unit of the present invention is characterized by comprising: a transfer belt, a plurality of rollers around which the transfer belt is laid with certain tension, wherein at least one of the rollers is a tension roller for tensioning to the transfer belt; frames supporting the plurality of rollers; tensioning mechanisms which are disposed on side faces of said frames to bias said tension roller in a belt tensioning direction; a cleaning means being in contact with the transfer belt at a position opposing said tension roller; rotation preventing members which prevents the rotational torque from being transmitted to said cleaning means; and position restricting members which restrict the relative position between said cleaning means and said tension roller.

The transfer belt unit is further characterized in that each of said tensioning mechanisms comprises an elongate hole which is formed in each frame and through which a stationary shaft of the tension roller is inserted, a turning lever which is rotatably disposed on the frame and has one end being in contact with said stationary shaft, and a spring which is disposed between the other end of the turning lever and the frame.

The transfer belt unit is further characterized in that each of said rotation preventing member comprises a fitting flange which is formed in said frame to extend in the belt tensioning direction, and a receiving groove which is formed in the cleaning means and is fitted with said fitting flange.

The transfer belt unit is still characterized in that each of said position restricting members is a plate connecting a cleaner casing of said cleaning means and the stationary shaft of the tension roller.

An image forming apparatus of the present invention is characterized by comprising image forming stations for respective colors arranged along a transfer belt unit as mentioned above, each image forming station including an image carrier, a charging means and a developing means disposed around said image carrier, wherein the transfer belt is passed through the respective image forming stations, thereby forming a multi-color image.

The image forming apparatus is further characterized in that said transfer belt is an intermediate transfer belt.

The image forming apparatus is further characterized in that said transfer belt is laid around a driving roller and the tension roller with certain tension, said tension roller is positioned obliquely above the driving roller and is disposed such that the belt tension side at the time of driving the transfer belt is on the lower side, and the image carriers of the respective image forming stations are in contact with the transfer belt on the belt tension side.

The image forming apparatus is furthermore characterized in that said cleaning means is positioned on said belt tension side.

The image forming apparatus is still further characterized in that a toner collecting container is arranged along the side surface of one of said frames.

For achieving the aforementioned first object, a transfer belt unit of the present invention is characterized by including a meandering prevention means which comprises: a roller body around which a transfer belt is wrapped; a pair of retaining flanges disposed at both sides of said roller body; a flange portion formed on one of said retaining flanges to project from the outer periphery of said roller body; a slidable flange slidably arranged in the other retaining flange; a spring which biases said slidable flange toward said one retaining flange; and a flange portion formed on said slidable flange to project from the outer periphery of said roller body, wherein both side edges of a transfer belt are restrained between the flange portion of said one retaining flange and the flange portion of said slidable flange.

The transfer belt unit is further characterized in that said other retaining flange has a concave portion formed therein and said slidable flange has a convex portion, and wherein said convex portion is fitted in said concave portion and said spring is partially disposed in said other retaining flange.

The transfer belt unit is further characterized in that said one retaining flange is made of a non-conductive and low sliding resistance resin, the other retaining flange is made of conductive and low sliding resistance resin, and said other retaining flange is grounded.

The transfer belt unit is further characterized in that said slidable flange and said spring are arranged in at least one of a driving roller and a driven roller.

The transfer belt unit is still characterized in that said slidable flange and said spring are arranged in the driven roller and the diameter of the driven roller is set to be larger than that of the driving roller.

The transfer belt unit is further characterized in that said transfer belt is a belt which is made by an extrusion moulding method and has extrusion traces formed in the inner surface of the belt along the width direction of the same.

The transfer belt unit is furthermore characterized in that said transfer belt is a belt which is made by a centrifugal moulding method and has a layer of a low frictional resistance material which is formed on the back of the belt.

The transfer belt unit is still further characterized in that the belt is formed to have side edges thicker than the middle portion thereof.

An image forming apparatus of the present invention is an image forming apparatus of a tandem type comprising image forming stations for respective colors arranged along a transfer belt unit, each image forming station including an image carrier, a charging means and a developing means disposed around said image carrier, wherein the transfer belt is passed through the respective image forming stations, thereby forming a multi-color image, and is characterized in that said transfer belt is laid around a driving roller and a driven roller and at least one of said driving roller and a driven roller employs a meandering prevention means as mentioned above.

The image forming apparatus is further characterized in that said transfer belt is a paper delivery belt or an intermediate transfer belt.

BRIEF DESCRIPTION OF THE DRAWINGS

FIGS. 10(A)–10(D) are illustrations for explaining a process of manufacturing a belt by a centrifugal moulding method according to the present invention, wherein FIG. 10(A) is a sectional view generally showing the belt with a mold, FIG. 10(B) is an enlarged sectional view of a portion B of FIG. 10(A), FIG. 10(C) is a sectional view of the belt manufactured, and FIG. 10(D) is a sectional view showing a state that the belt is wrapped around a roller body.

DETAILED DESCRIPTION OF THE PREFERRED EMBODIMENTS

Figure 1:
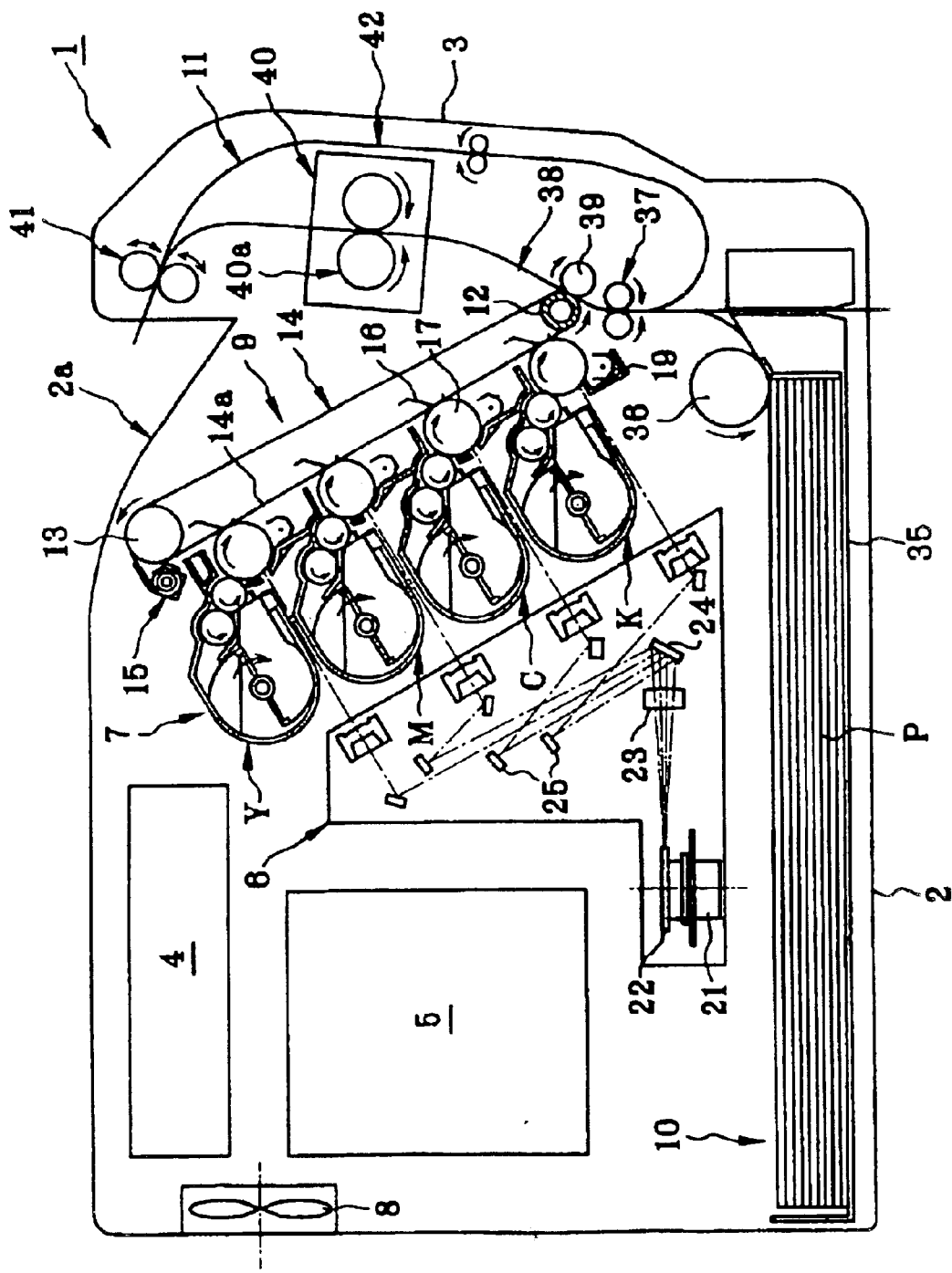
FIG. 1 is schematic sectional view showing the entire structure of an embodiment of an image forming apparatus to which the present invention is adopted.
Figure 2:
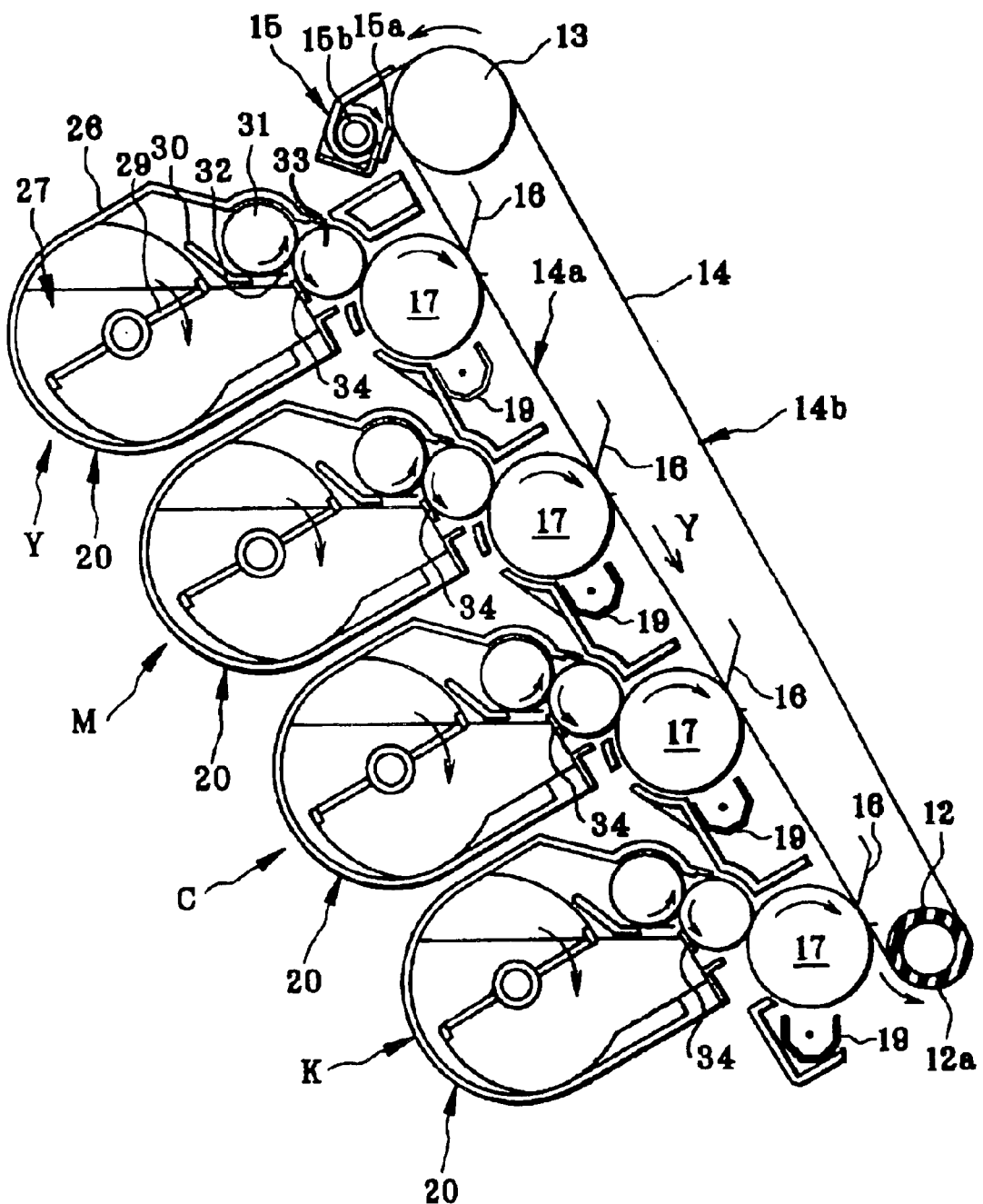
FIG. 2 is an enlarged view of main parts of the apparatus of FIG. 1.

Hereinafter, embodiments of the present invention will be described with reference to the drawings. FIG. 1 and FIG. 2 show an embodiment of the image forming apparatus to which the present invention is adopted, wherein FIG. 1 is a schematic sectional view showing the entire structure thereof and FIG. 2 is an enlarged view of main parts in FIG. 1. This embodiment is of a type employing the intermediate transfer method as described above.

In FIG. 1, the image forming apparatus 1 of this embodiment comprises a housing 2, an outfeed tray 2a formed in the top of the housing 2, and a door body 3 which is attached to the front of the housing 2 in such a manner that the door body 3 is able to open or close freely. Arranged within the housing 2 are a control unit 4, a power source unit 5, an exposure unit (exposure means) 6, an image forming unit 7, a cooling means 8 composed of an air fan, a transfer belt unit 9, and a paper feeding unit 10. Arranged within the door body 3 is a paper handling unit 11. The respective units are designed to be detachable relative to the housing 2, whereby these units can be temporally detached for the purpose of repair or replacement for the time of maintenance.

The transfer belt unit 9 comprises a driving roller 12 which is disposed in a lower portion of the housing 2 and is driven by a driving means (not shown) to rotate, a driven roller 13 which is disposed diagonally above the driving roller 12, an intermediate transfer belt 14 which is laid around the two rollers with certain tension and is driven to circulate in a direction indicated by an arrow (the counterclockwise direction), and a cleaning means 15 which abuts on the surface of the intermediate transfer belt 14. The driven roller 13 and the intermediate transfer belt 14 are arranged obliquely to the upper left of the driving roller 12 in FIG. 1. Accordingly, during the operation of the intermediate transfer belt 14, a belt face 14a of which traveling direction Y is downward takes a lower side and a belt face 14b of which traveling direction is upward takes an upper side. In this embodiment, the belt face 14a is a tension side (a side tensioned by the driving roller 12) at the time of driving the intermediate transfer belt 14 and the belt face 14b is a slack side at the time of driving the intermediate transfer belt 14.

The driving roller 12 also functions as a back-up roller for a secondary transfer roller 39 described later. As shown in FIG. 2, formed on the peripheral surface of the driving roller 12 is a rubber layer 12a which is 3 mm in thickness and $10^5$ Ω·cm or less in volume resistivity. The driving roller 12 has a metallic shaft which is grounded so as to function as a conductive path for secondary transfer bias supplied through the secondary transfer roller 39. Since the driving roller 12 is provided with the rubber layer 12a having high friction and shock absorption, impact generated when a receiving medium is fed into a secondary transfer section is hardly transmitted to the intermediate transfer belt 14, thereby preventing the deterioration of image quality.

In this embodiment, the diameter of the driving roller 12 is set to be smaller than the diameter of the driven roller 13. This facilitates the separation of a receiving medium after secondary transfer because of the elastic force of the receiving medium itself. The driven roller 13 also functions as a back-up roller for the cleaning means 15 described later.

The cleaning means 15 is located at the belt face 14a side, of which traveling direction is downward. As shown in FIG. 2, the cleaning means 15 comprises a cleaning blade 15a for removing toner remaining on the surface of the intermediate transfer belt 14 after the secondary transfer, and a toner carrying member 15b for carrying collected toner. The cleaning blade 15a is in contact with the intermediate transfer belt 14 at a position where the intermediate transfer belt 14 is wrapped around the driven roller 13.

On the back of the intermediate transfer belt 14, primary transfer members 16 composed of leaf spring electrodes are disposed. The primary transfer members 16 are pressed into contact with the back of the intermediate transfer belt 14 by their elastic force at locations corresponding to image carriers 17 of respective image forming stations Y, M, C, and K, described later. A transfer bias is applied to each primary transfer member 16.

The image forming unit 7 comprises the image forming stations Y (for yellow), M (for magenta), C (for cyan), and K (for black) for forming multi-color images (in this embodiment, four-color images). As clearly shown in FIG. 2, each image forming station Y, M, C, K has an image carrier 17 composed of a photosensitive drum, a charging means 19 composed of a corona charging means, and developing means 20 which are arranged around the image carrier 17. It should be understood that the image forming stations Y, M, C, K may be arranged in any order.

The image forming stations Y, M, C, K are disposed such that the respective image carriers 17 are in contact with the belt face 14a, of which traveling direction is downward, of the intermediate transfer belt 14. As a result of this, the image forming stations Y, M, C, K are arranged in an obliquely leftward direction relative to the driving roller 12 in FIG. 2. Each image carrier 17 is driven to rotate in the traveling direction of the intermediate transfer belt 14 as indicated by arrows. It should be noted that the intermediate transfer belt 14 may be arranged in an obliquely rightward direction relative to the driving roller 12. In this case, the belt traveling direction Y should be the counter direction and the belt face of which traveling direction is downward should be the surface 14b.

The exposure means 6 is disposed in a space formed obliquely below the image forming unit 7 which is arranged obliquely. The control unit 4 and the power source unit 5 are disposed in a space above the exposure means 6. The paper feeding unit 10 is disposed below the exposure means 6 and at the bottom of the housing 2. Since the control unit 4 and the power source unit 5 are arranged adjacent to the exposure means 6, this arrangement can reduce the area for placing as compared to a case in which these are arranged in parallel to the frame supporting the components of the apparatus.

As shown in FIG. 1, the exposure means 6 comprises a polygon mirror motor 21, a polygon mirror 22, a single f-θ lens 23, and a reflection mirror 24. In addition, four reflective mirrors 25 are disposed above the reflection mirror 24 to make scanning lines for the respective colors parallel to the belt face 14a and three reflective mirrors 25 are further disposed to aim the scanning lines, reflected by the reflective mirrors 25, to the image carriers 17.

By providing the reflective mirrors 25, the scanning lines are bent, thereby shortening the height of the exposure means 6 and thus making the apparatus compact. The reflective mirrors 25 are arranged in such a manner as to make the respective lengths of the scanning lines to the image carriers 17 of the image forming stations Y, M, C, K equal to each other.

In the exposure means 6 having the aforementioned structure, image signals corresponding to the respective colors are formed and modulated according to the common data clock frequency and are then radiated from the polygon mirror 22. The radiated image signals are aimed to the image carriers 17 of the image forming stations Y, M, C, K via the f-θ lens 23, the reflection mirror 24, and the reflective mirrors 25, thereby forming latent images.

In this embodiment, the scanning optical system is arranged at a lower side of the apparatus, thereby minimizing the vibration of the scanning optical system due to vibration of the driving system of the image forming means which affects the frame supporting the apparatus and thus preventing the deterioration of image quality.

The cooling means 8 composed of an air fan is provided on one side of the housing 2 to introduce atmosphere in a direction of arrows in order to cool the exposure means 6, the control unit 4, and the power source unit 5. Atmosphere drawn inside the apparatus from the rear side in the feeding direction of receiving media P or in the width direction of the feeding direction of receiving media P is introduced to the periphery of the polygon motor 21, is then introduced to the control unit 4 and the power source unit 5, and, after that, is discharged outside of the apparatus, thereby restricting the increase in temperature of the polygon motor 21, preventing the deterioration of image quality and increasing the life of the polygon motor 21.

Hereinafter, the developing means 20 will be described in detail, taking the image forming station Y in FIG. 2 as an example. In this embodiment, since the image forming stations Y, M, C, K are arranged obliquely and the image carriers 17 are in contact with the belt face 14a, of which traveling direction is downward, of the intermediate transfer belt 14, toner containers 26 are arranged obliquely downward. For this, special structure is employed in the developing means 20.

That is, the developing means 20 each comprises the toner container 26, a toner storage area 27 formed in the toner container 26 for storing toner (indicated by hatching), a toner agitating member 29 disposed inside the toner storage area 27, a partition 30 defined in an upper portion of the toner storage area 27, a toner supply roller 31 disposed above the partition 30, a flexible blade 32 attached to the partition 30 to abut the toner supply roller 31, the development roller 33 arranged to abut both the toner supply roller 31 and the image carrier 17, and a regulating blade 34 arranged to abut the development roller 33.

The image carrier 17 is rotated in the traveling direction of the intermediate transfer belt 14. The development roller 33 and the supply roller 31 are rotated in a direction opposite to the rotational direction of the image carrier 17 as shown by arrow. On the other hand, the agitating member 29 is rotated in a direction opposite to the rotational direction of the supply roller 31. Toner agitated and scooped up by the agitating member 29 in the toner storage area 27 is supplied to the toner supply roller 31 along the upper surface of the partition 30. Friction is caused between the toner and the flexible blade 32 so that mechanical adhesive force and adhesive force by triboelectric charging are created relative to the rough surface of the supply roller 31. By these adhesive forces, the toner is supplied to the surface of the development roller 33. The toner supplied to the development roller 33 is regulated into a coating layer having a predetermined thickness by the regulating blade 34. The toner layer as a thin layer is carried to the image carrier 17 so as to develop a latent image on the image carrier 17 at and near a nip portion which is a contact portion between the development roller 33 and the image carrier 17.

In this embodiment, the development roller 33 disposed facing the image carrier 17, the toner supply roller 31, and the contact portion of the regulating blade 34 relative to the development roller 33 are not submerged in the toner in the toner storage area 27. This arrangement can prevent the contact pressure of the regulating blade 34 relative to the development roller 33 from being varied due to the decrease of the stored toner. In addition, since excess toner scraped from the development roller 33 by the regulating blade 34 spills onto the toner storage area 27, thereby preventing filming of the development roller 33.

The contact portion between the development roller 33 and the regulating blade 34 is positioned below the contact portion between the supply roller 31 and the development roller 33. There is a passage for returning excess toner, which was supplied to the development roller 33 by the supply roller 31 but not transmitted to the development roller 33, and excess toner, which was removed from the development roller 33 by the regulating operation of the regulating blade 34, to the toner storage area 27 at the lower portion of the developing means. The toner returned to the toner storage area 27 is agitated with toner in the toner storage area 27 by the agitating member 29, and is supplied to a toner inlet near the supply roller 31 again. Therefore, the excess toner is let down to the lower portion without clogging the friction portion between the supply roller 31 and the development roller 33 and the contact portion between the development roller 33 and the regulating blade 34 and is then agitated with toner in the toner storage area 27, whereby the toner in the developing means deteriorates slowly so that portentous changes in image quality just after the replacement of the developing means is prevented.

As shown in FIG. 1 again, the paper feeding unit 10 comprises a sheet cassette 35 in which a pile of receiving media P are held, and a pick-up roller 36 for feeding the receiving media P from the sheet cassette 35 one by one.

The paper handling unit 11 comprises a pair of gate rollers 37 (one of which is attached to the housing 2) for regulating the feeding of a receiving medium P to the secondary transfer portion at the right time, the secondary transfer roller 39 as a secondary transfer means abutting and pressed against the driving roller 12 and the intermediate transfer belt 14, a main feeding passage 38, the fixing means 40, a pair of outfeed rollers 41, and a dual-side printing passage 42.

The fixing means 40 comprises a pair of fixing rollers 40a at least one of which has a built-in heating element such as a halogen heater and which are freely rotatable, and a pressing means for pressing at least one of the rollers against the other roller to fix a secondary image secondarily transferred to the receiving medium P. The secondary image secondarily transferred to the receiving medium is fixed to the receiving medium at the nip portion formed between the fixing rollers 40a at a predetermined temperature. In this embodiment, the fixing means 40 can be arranged in a space formed obliquely above the belt face 14b, of which traveling direction is upward, of the transfer belt, that is, a space formed on the opposite side of the image forming stations relative to the transfer belt. This arrangement enables the reduction in heat transfer to the exposure means 6, the intermediate transfer belt 14, and the image forming means and lessens the frequency of taking the action for correcting color registration error. In particular, the exposure means 6 is positioned farthest from the fixing means 40, thereby minimizing the deformation of the scanning optical components due to heat and thus preventing the occurrence of color registration error.

In this embodiment, since the intermediate transfer belt 14 is disposed in a slanting direction relative to the driving roller 12, a large space is created on the right side of the intermediate transfer belt 14 in FIG. 1. The fixing means 40 can be disposed in the space, thereby achieving the reduction in size of the apparatus. This arrangement also prevents the heat generated by the fixing means 40 from being transferred to the exposure unit 6, the intermediate transfer belt 14, and the respective image forming stations Y, M, C, K which are located on the left side of the fixing means 40. Since the exposure unit 6 can be located in a space on the lower left side of the image forming unit 7, the vibration of the scanning optical system due to vibration of the driving system of the image forming means affecting the housing 2 can be minimized and the deterioration of image quality can be prevented.

Further, in this embodiment, by employing spheroidized toner, the primary transfer efficiency is increased (approximately 100%). Therefore, no cleaning means for collecting residual toner after the primary transfer is used for the respective image carriers 17. Accordingly, the image carriers 17 of which diameter is 30 mm or less can be arranged closely to each other, thereby reducing the size of the apparatus.

Because no cleaning device is used, the corona charging means 19 is employed as a charging means. When the charging means is a roller, residual toner after the primary transfer on the image carrier 17 (the amount of which should be small) is deposited on the roller, leading to insufficient charging. On the other hand, since the corona charging means 19 is a non-contact charging means, toner hardly adheres to the image carriers, thereby preventing the occurrence of insufficient charging.

The actions of the image forming apparatus as a whole will be summarized as follows:

(1) As a printing command (image forming signal) is inputted into the control unit 4 of the image forming apparatus 1 from a host computer (personal computer) (not shown) or the like, the image carriers 17 and the respective rollers of the developing means 20 of the respective image forming stations Y, M, C, K, and the intermediate transfer belt 14 are driven to rotate.

(2) The outer surfaces of the image carriers 17 are uniformly charged by the charging means 19.

(3) In the respective image forming stations Y, M, C, K, the uniformly charged outer surfaces of the image carriers 17 are exposed to selective light corresponding to image information for respective colors by the exposure unit 6, thereby forming electrostatic latent images for the respective colors.

(4) The electrostatic latent images formed on the image carriers 17 are developed by the developing means 20 to form toner images.

(5) The primary transfer voltage of the polarity opposite to the polarity of the toner is applied to the primary transfer members 16 of the intermediate transfer belt 14, thereby transferring the toner images formed on the image carriers 17 onto the intermediate transfer belt 14 sequentially. According to the movement of the intermediate transfer belt 14, the toner images are superposed on the intermediate transfer belt 14.

(6) In synchronization with the movement of the intermediate transfer belt 14 on which primary images are transferred, a receiving medium P accommodated in the sheet cassette 35 is fed to the secondary transfer roller 39 through the pair of resist rollers 37.

(7) The primary-transferred image meets with the receiving medium at the secondary transfer portion. A bias of the polarity opposite to the polarity of the primary transfer image is applied by the secondary transfer roller 39 which is pressed against the driving roller 12 for the intermediate transfer belt 14 by a pressing mechanism (not shown), whereby the primary-transferred image is secondarily transferred to the receiving medium fed in the synchronization manner.

(8) Residual toner after the secondary transfer is carried toward the driven roller 13 and is scraped by the cleaning means 15 disposed opposite to the roller 13 so as to refresh the intermediate transfer belt 14 to allow the above cycle to be repeated.

(9) The receiving medium passes through the fixing means 40 whereby the toner image on the receiving medium is fixed. After that, the receiving medium is carried toward a predetermined position (toward the outfeed tray 2a in case of single-side printing, or toward the dual-side printing passage 42 in case of dual-side printing).

Figure 3:
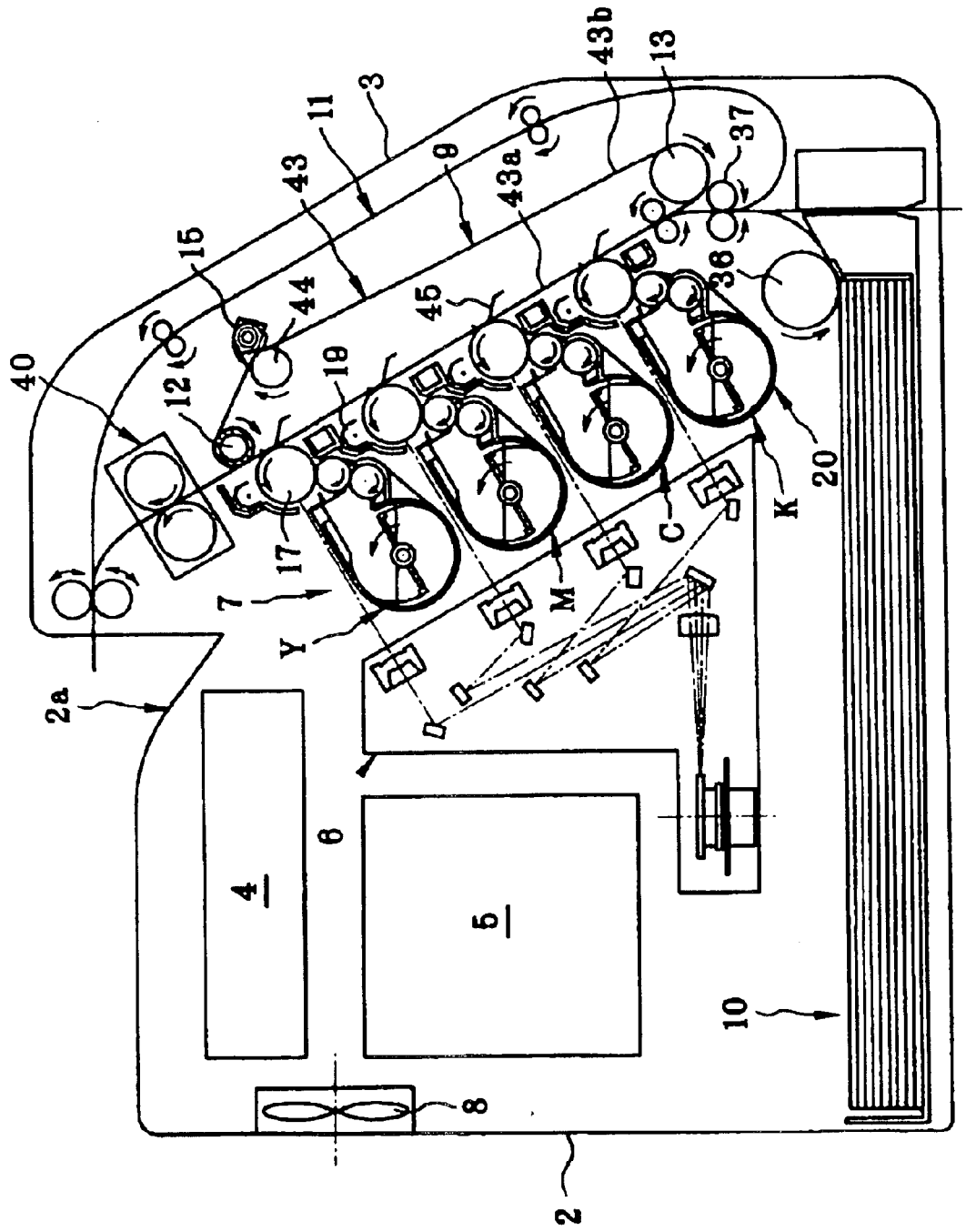
FIG. 3 is a schematic sectional view showing the entire structure of another embodiment of an image forming apparatus to which the present invention is adopted.

FIG. 3 is a schematic sectional view showing the entire structure of another embodiment of the image forming apparatus to which the present invention is adopted. The same components as those of the embodiment of FIG. 1 are marked with the same numerals, so description of such components will be omitted. This embodiment is of a type employing the paper delivery method as mentioned above. In this embodiment, therefore, a paper delivery belt 43 is employed instead of the intermediate transfer belt 14.

In this embodiment, a transfer belt unit 9 and a paper handling unit 11 are arranged in a door body 3. The transfer belt unit 9 comprises a driving roller 12 which is disposed in an upper portion of a housing 2 and is driven by a driving means (not shown) to rotate, a driven roller 13 and a backup roller 44 which are disposed diagonally below the driving roller 12, a paper delivery belt 43 which is laid around the three rollers with certain tension and is driven to circulate in a direction indicated by an arrow (the clockwise direction), and a cleaning means 15 which is in contact with the surface of the paper delivery belt 43 to oppose the back-up roller 44. The driving roller 12 and the paper delivery belt 43 are arranged obliquely to the upper left of the driving roller 13. Accordingly, a belt tension side (a side tensioned by the driving roller 12) 43a at the time of driving the paper delivery belt 43 is on the lower side and a belt slack side 43b is on the upper side.

On the back of the paper delivery belt 43, transfer members 45 composed of leaf spring electrodes are disposed. The transfer members 45 are pressed into contact with the back of the paper delivery belt 43 by their elastic force at locations corresponding to image carriers 17 of respective image forming stations Y, M, C, and K. A transfer bias is applied to each transfer member 45. The image carriers 17 of the image forming stations Y, M, C, K are in contact with the belt tension side 43a of the paper delivery belt 43. As a result of this, the image forming stations Y, M, C, K are arranged to be inclined in an obliquely leftward direction relative to the driven roller 13 in FIG. 3.

Figure 4:
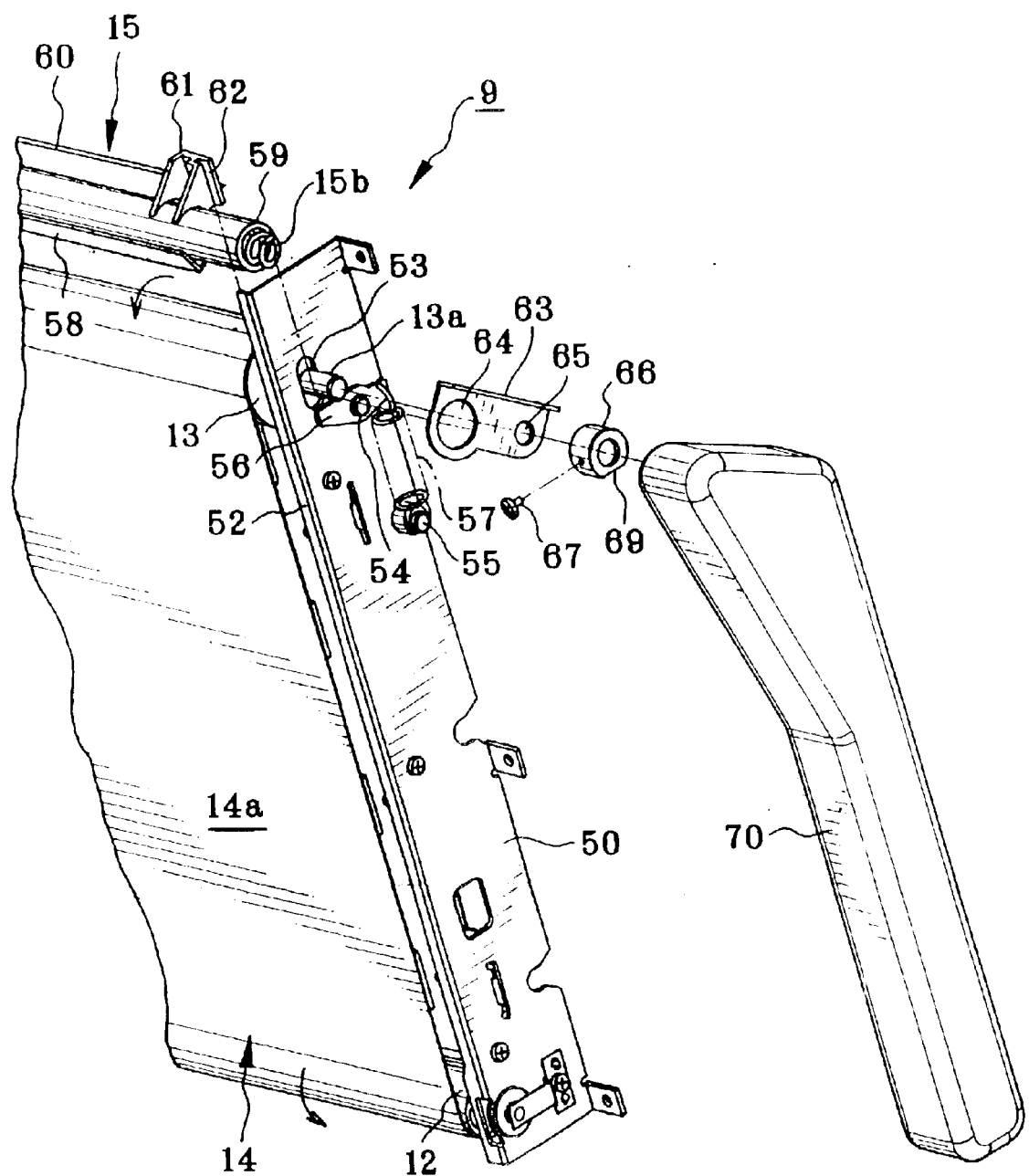
FIG. 4 is an exploded perspective view showing an embodiment of a transfer belt unit according to the present invention.
Figure 5:
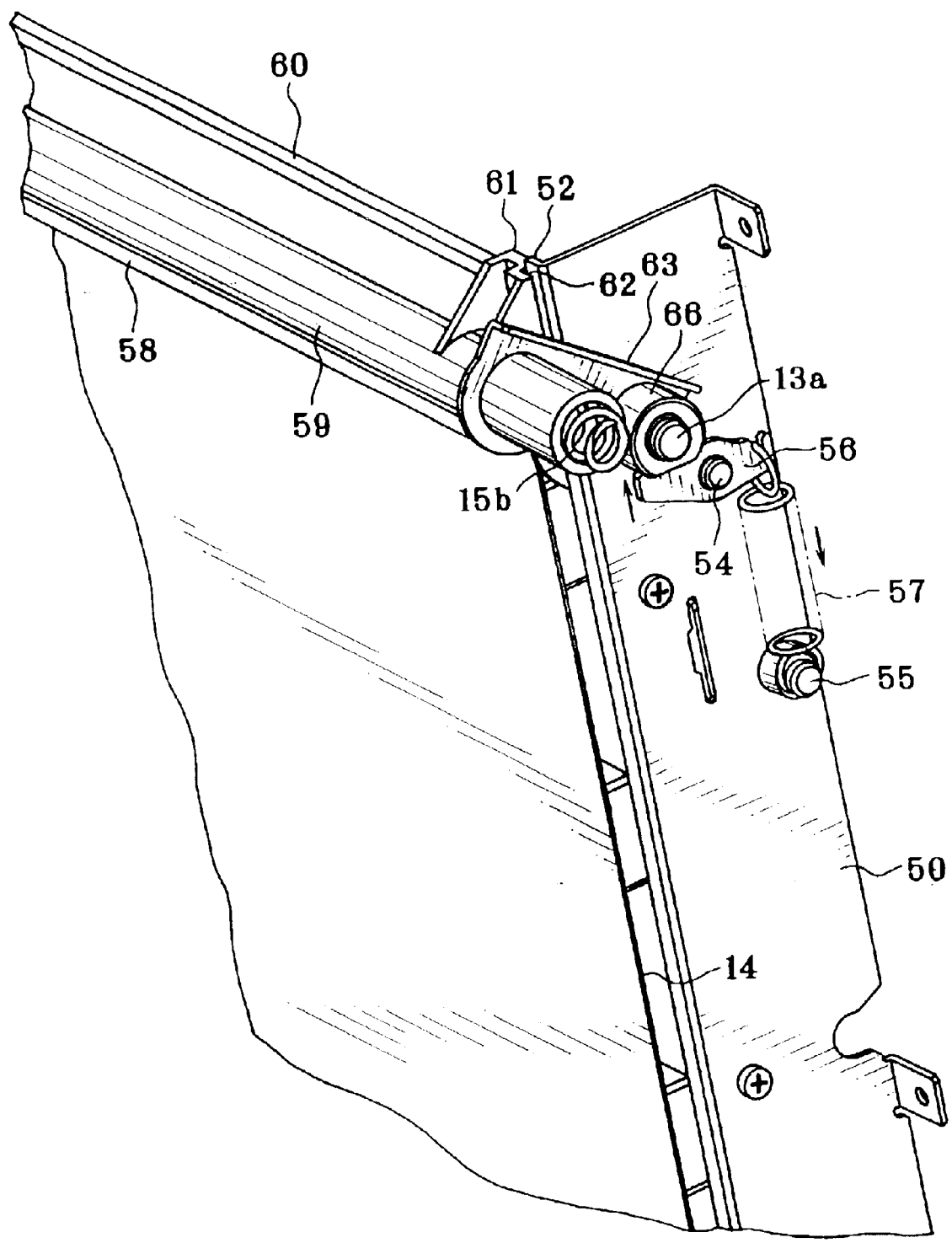
FIG. 5 is a perspective view partially showing the transfer belt unit shown in FIG. 4 in the assembled state.
Figure 6:
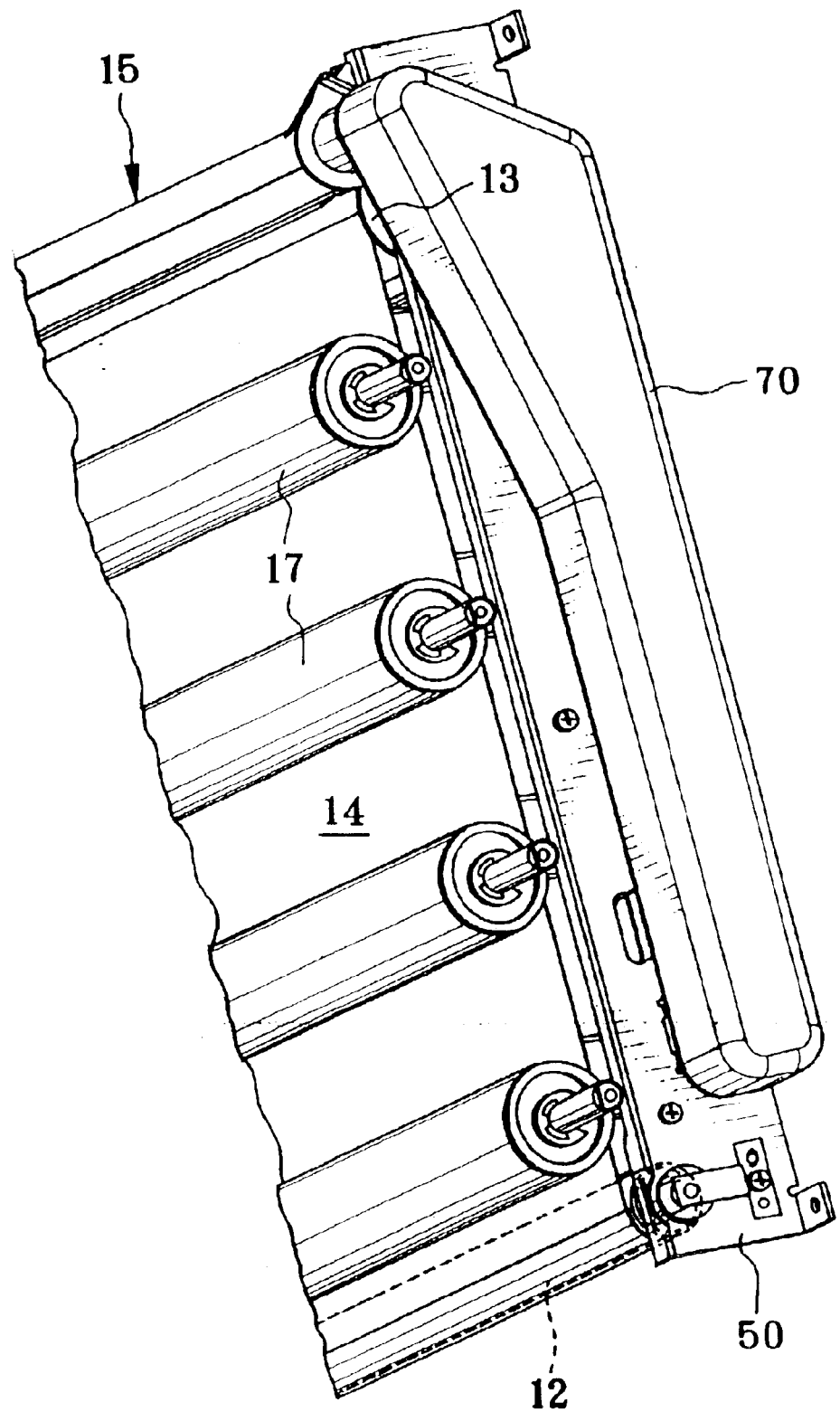
FIG. 6 is a perspective view generally showing the transfer belt unit shown in FIG. 4 in the assembled state.
Figure 7A:
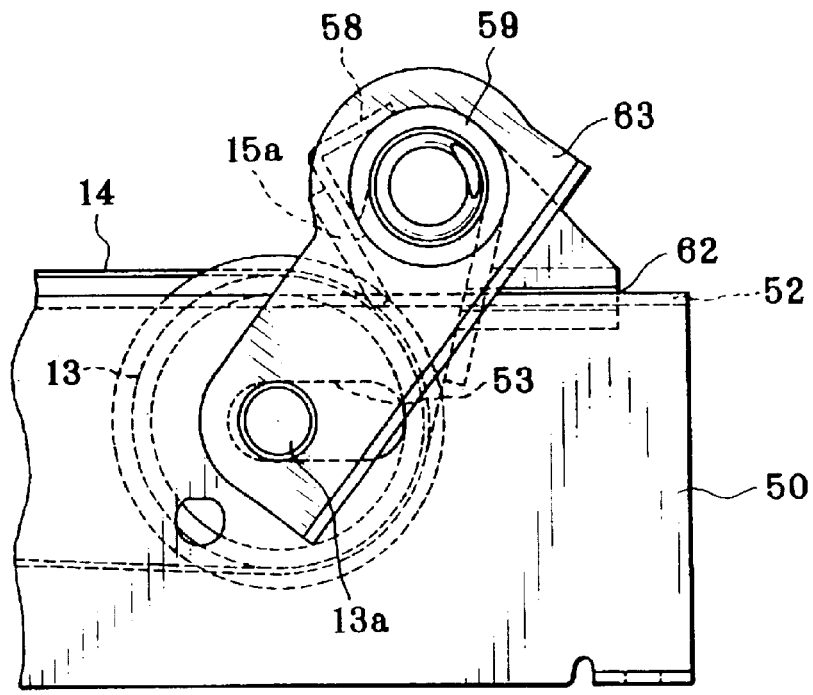
FIGS. 7(A), 7(B) are partial side views for explaining the actions.
Figure 7B:
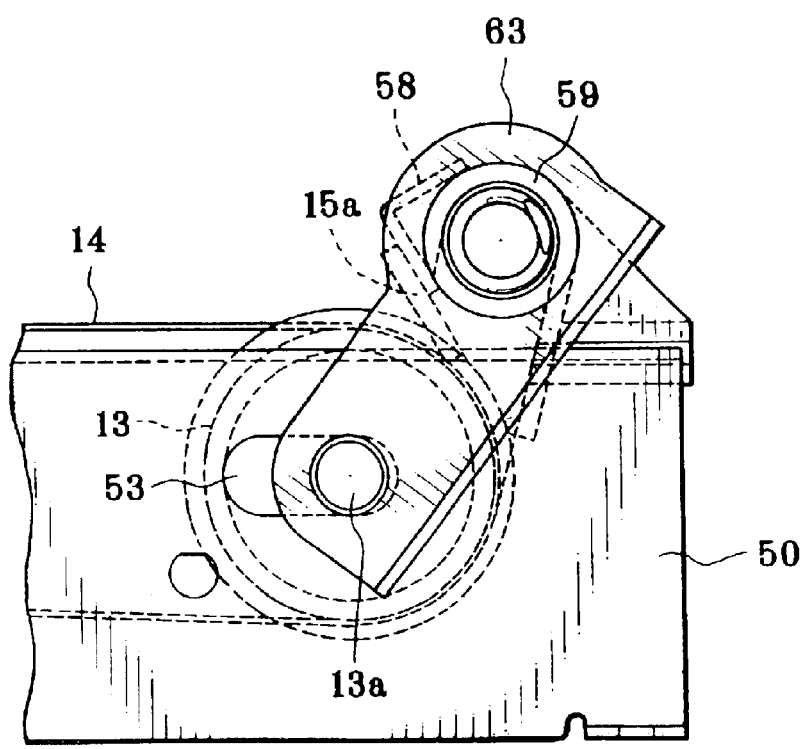

Hereinafter, a transfer belt unit according to the present invention will be described. FIG. 4 is an exploded perspective view showing an embodiment of the transfer belt unit, FIG. 5 is a perspective view partially showing the transfer belt unit shown in FIG. 4 in the assembled state, FIG. 6 is a perspective view generally showing the transfer belt unit shown in FIG. 4 in the assembled state, and FIGS. 7(A), 7(B) are partial side views for explaining the actions.

In FIG. 4, a tension roller 13 and a driving roller 12 are supported by frames 50 such that these rollers are freely rotatable. A transfer belt 14 is laid around the driving roller 12 and the tension roller 13 with certain tension. Though only one of the frames 50 is shown in the drawings, the left and right frames are the same in structure.

Each of the frames 50 is provided with a fitting flange 52 which is formed by bending an edge portion thereof toward the belt tension side 14a to extend along the belt tensioning direction. The frame 50 has an elongate hole 53, extending in the belt tensioning direction, through which a stationary shaft 13a supporting the tension roller 13 is inserted so that the tension roller 13 is movable because the sliding of the stationary shaft 13a is allowed within the elongated hole 53.

The frame 50 is provided with a stub pin 54 located obliquely below the elongate hole 53 and further a stub pin 55 located obliquely below the stub pin 54. A turning lever 56 is rotatably fitted to the stub pin 54. On end of the turning lever 56 is connected to one end of a spring 57. The other end of the spring 57 is fixed to the stub pin 55. Therefore, the spring 57 pulls the one end of the turning lever 56 in a direction of an arrow in FIG. 5 so that the other end of the turning lever 56 is moved in a direction of another arrow in FIG. 5. In the present invention, the elongate hole 53, the turning lever 56, and the spring 57 are defined together as a tensioning mechanism for the tension roller 13.

A cleaning means 15 is disposed on the belt tension side 14a and has a cylindrical cleaner casing 59. Fixed to the outer periphery of the cleaner casing 59 is a supporting member 58 which supports a cleaning blade 15a as shown in FIG. 2. Disposed inside the cleaner casing 59 is a toner carrying member 15b composed of a rotational auger for carrying collected toner. The cleaning blade 15a is in contact with the transfer belt 14 at a position where the transfer belt 14 is wrapped around the tension roller 13.

On the outer periphery of the cleaner casing 59, a reinforcing wall 60 is disposed to extending in the axial direction. Disposed on both ends of the reinforcing wall 60 are supporting walls 61 extending in the circumferential direction. Each supporting wall 61 has a receiving groove 62 extending in the belt tensioning direction. By fitting the receiving groove 62 to the fitting flange 52, the cleaner casing 59 is positioned in the belt tensioning direction along the fitting flange 52. Accordingly, as shown in FIG. 7(A), the guide face of the fitting flange 52 receives the rotational torque acting on the cleaning blade 15a when the transfer belt is rotated, thereby preventing the rotation of the cleaning blade. Therefore, the fitting flanges 52 of the flames 50 and the receiving grooves 62 of the supporting walls 61 cooperate to function as a rotation preventing member of the cleaning means 15.

On each frame 50, a position restricting member 63 made of a plate is fitted and fixed to the cleaner casing 59 and the stationary shaft 13a of the tension roller 13. The position restricting member 63 is provided with through holes 64, 65 for receiving the cleaner casing 59 and the stationary shaft 13a. The position restricting member 63 is secured by a securing member 66 composed of a collar to be fixed to the stationary shaft 13a. The securing member 66 has a tapped hole formed in the outer periphery and is fixed to the stationary shaft 13a by a screw 67.

The securing member 66 has a flat contact face 69 formed in the outer periphery thereof. The other end of the turning lever 56 is in contact with the contact face 69, whereby the turning lever 56 presses the stationary shaft 13a to slide along the elongate hole 53 in the direction of arrow in FIG. 5 by the biasing force of the spring 57 so as to tension the transfer belt 14. As shown in FIG. 7(B), even when the stationary shaft 13a displaces, the receiving groove 62 displaces along the fitting flange 52 and the cleaner casing 59 is still positioned by the position restricting member 63. Therefore, the position of the cleaning blade 15a relative to the stationary shaft 13a, i.e. the tension roller 13 is not varied.

Fixed to the frame 50 is a toner collecting container 70 which has a shape extending along the side surface of the frame 50 as shown in FIG. 6. The end of the cleaner casing 59 is connected to an upper portion of the toner collecting container 60. Collected toner carried by the carrying member 15b falls down into the toner collecting container 70 because of gravity.

As apparent from the above description, according to this embodiment, a mechanism for tensioning the belt is arranged on the side surfaces of the transfer belt unit, thereby reducing the size of the transfer belt unit in the belt tensioning direction and thus achieving the reduction in size and cost.

Even when the position of the tension roller is varied due to allowable error in length of the transfer belt and allowable variance in tension, the cleaning means is linked with tension roller to follow such variation. Therefore, the contact position of the cleaning blade relative to the tension roller is not varied, thus preventing the fluctuation of cleaning performance.

Though the present invention is adopted to the apparatus employing the intermediate transfer method in the above embodiment, the present invention may be adopted to an apparatus employing the paper delivery method. Though the tension roller 13 is a driven roller in the above embodiment, the tension roller 13 may be a driving roller. In addition, though the transfer belt is laid around the two rollers in the above embodiment, the transfer belt may be laid around three rollers.

Figure 8:
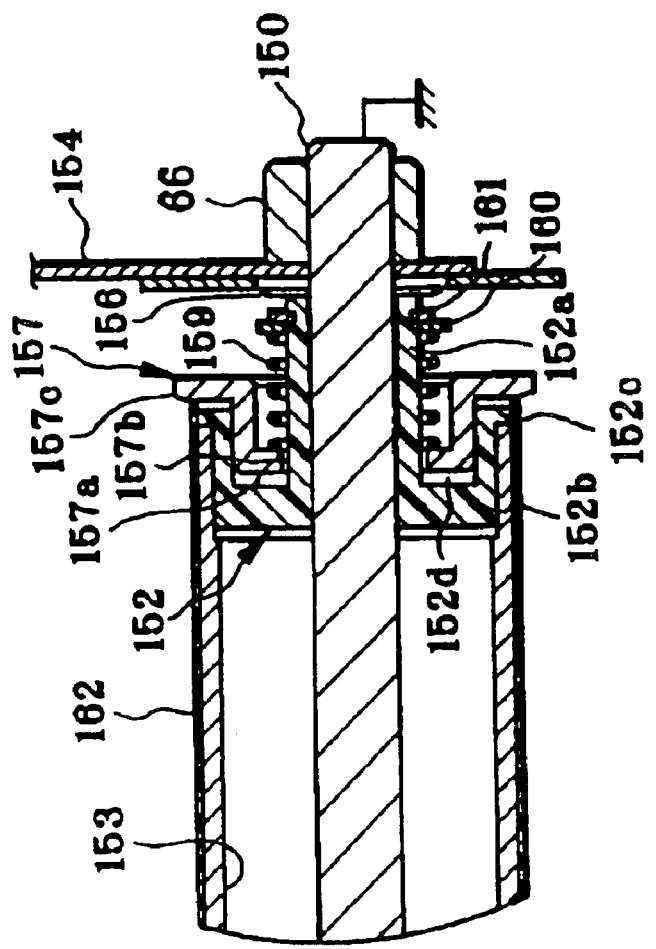
FIG. 8 is a sectional view showing an embodiment of a meandering prevention device for a transfer belt according to the present invention.
Figure 8:
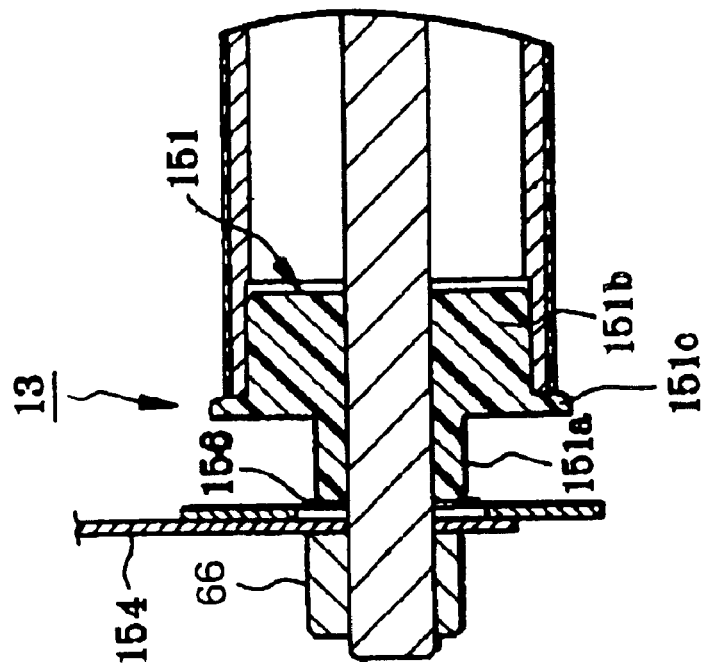

Hereinafter, description will now be made as regard to a meandering prevention device for the transfer belt in order to achieve the second object of the present invention. FIG. 8 is a sectional view showing one embodiment thereof.

A driven roller 13 comprises a stationary shaft 150 made of a metal, a pair of retaining flanges 151, 152 rotatably attached to the stationary shaft 150, and a cylindrical roller body 153 made of aluminum fixed between the retaining flanges 151, 152. The stationary shaft 150 penetrates the left and right frames 154, 154 of the transfer belt unit and is fixed by securing members 66.

The retaining flanges 151, 152 function as bearing members for supporting the roller body 153. One retaining flange 151 is made of a non-conductive and low sliding resistance resin (e.g. polyacetal), the other retaining flange 152 is made of a conductive and low sliding resistance resin, and the stationary shaft 150 is grounded. Therefore, charge remaining on the belt and charge produced by friction between the back of the belt and the surface of the roller can be easily removed. The one flange 151 is made of non-conductive material and the other flange 152 having smaller volume is made of conductive material to function as a conductive bearing, thereby minimizing the consumed amount of the conductive material which is expensive.

The retaining flanges 151, 152 comprise shaft portions 151a, 152a, large-diameter roller fixing portions 151b, 152b continuously formed with the shaft portions 151a, 152a, and flange portions 151c, 152c radially projecting from end portions of the outer peripheries of the roller fixing portions 151b, 152b, respectively. The both ends of the roller body 153 are fitted around the roller fixing portions 151b, 152b and fixed by the roller fixing portions 151b, 152b and the flange portions 151c, 152c, respectively.

The flange portion 151c of the one retaining flange 151 further projects radially from the outer surface of the roller body 153, while the flange portion 152c of the other retaining flange 152 is flush with the outer surface of the roller body 153. The shaft portions 151a, 152a of the retaining flanges 151, 152 are disposed rotatably relative to the left and right frames via shims 156, 156.

The other retaining flange 152 has a ring-like concave portion 152d formed in the roller fixing portion 152b at a location around the shaft portion 152a. Fitted into the concave portion 152d is a slidable flange 157. The slidable flange 157 comprises a cylindrical convex portion 157a to be fitted into the concave portion 152d, a through hole 157b formed in the convex portion 157a, and a flange portion 157c formed at the outer end of the convex portion 157 to extend radially. The shaft portion 152a is inserted through the through hole 157b of the convex portion 157a, thereby fitting the convex portion 157a into the concave portion 152d. A spring 159 is arranged such that one end of the spring 159 is in contact with an inner surface of the convex portion 157a and the other end of the spring 159 is fixed to the shaft portion 152a by a spring washer 160 and a snap ring 161. Therefore, the spring 159 is partially disposed inside the retaining flange 152, thereby shortening the span between the frames 154, 154 and thus shortening the size of the apparatus in the width direction. This means that the apparatus can be designed compact.

A transfer belt 162 (the intermediate transfer belt 14 of FIG. 1 or the paper delivery belt 43 of FIG. 3) is wrapped around the outer periphery of the roller body 153. One side edge of the transfer belt 162 is brought in contact with the flange portion 151c of the retaining flange 151 and the other side edge of the transfer belt is brought in contact with the flange portion 157c of the slidable flange 157. As the transfer belt 162 is about to meander in this state, the slidable flange 157 moves within the concave portion 152d because of the biasing force of the spring 159 so as to restrain the other side edge of the transfer belt 162 to keep the one side edge of the transfer belt 162 in contact with the flange portion 151c of the retaining flange 151, thereby preventing the meandering of the transfer belt.

This embodiment employs a method for preventing the meandering of the belt by holding the left and right side edges of the belt with the flange portion 151c of the retaining flange 151 and the flange portion 157c of the slidable flange 157 from both sides. The following two matters are important for carrying out this method.

(1) To make the frictional resistance between the back of the belt 162 and the surface of the roller body 153 low.

For positioning the side edge of the belt at the flange portion 151c of the retaining flange 151 by biasing force of the slidable flange 157, it is required to smoothly propagate the biasing force of the slidable flange 157 to the retaining flange 151 side. If the frictional resistance between the back of the belt 162 and the surface of the roller body 153 is high, it is difficult to smoothly propagate the biasing force of the slidable flange 157 toward the retaining flange 151 side. If the biasing force toward the flange portion 151c of the retaining flange 151 is increased excessively, wrinkle may be created on the belt in a direction (the radial direction of the roller) perpendicular to the direction of the biasing force so as to not only fail to prevent the meandering but also damage the belt such as cracking the edge of the belt. For this, the material having low frictional resistance is used for the whole belt or the back of the belt, and/or an outer layer having low frictional resistance is formed on the surface of the roller.

(2) To design the belt capable of resisting deformation or damage against the force biasing the belt toward the retaining flange 151.

The strength of the belt is improved against the force biasing the belt toward the retaining flange 151 by setting the amount of a portion of the belt to be wrapped around the roller having the meandering prevention mechanism larger than that of the belt to be wrapped around the other roller such that the portion of the belt to be restrained by the meandering prevention mechanism has a half-cylindrical shape. Since the side edges of the belt repeatedly collide with the flange portions 151c, 157c, respectively so that the side edges easily suffer some cracks, the belt is formed to be thick only along the side edges thereof or reinforced by separate members. Though using a high rigid member for making the belt (making the belt of a material having higher rigidity or inserting a high rigid material such as a metal between belt materials) is also considered, it is not preferable because tension to be applied to the belt for laying the belt in a predetermined configuration should be large so as to increase the driving load and, in addition, when the belt is stopped for a long period of time, a warp (creep) is created at the portion wrapped around the roller.

Now, description will be made as regard to the method of manufacturing the belt for obtaining the aforementioned characteristics (1), (2). As the method of manufacturing seamless belts, there are extrusion moulding method and a centrifugal moulding method. Devised points in the respective methods will be explained below.

Figure 9:
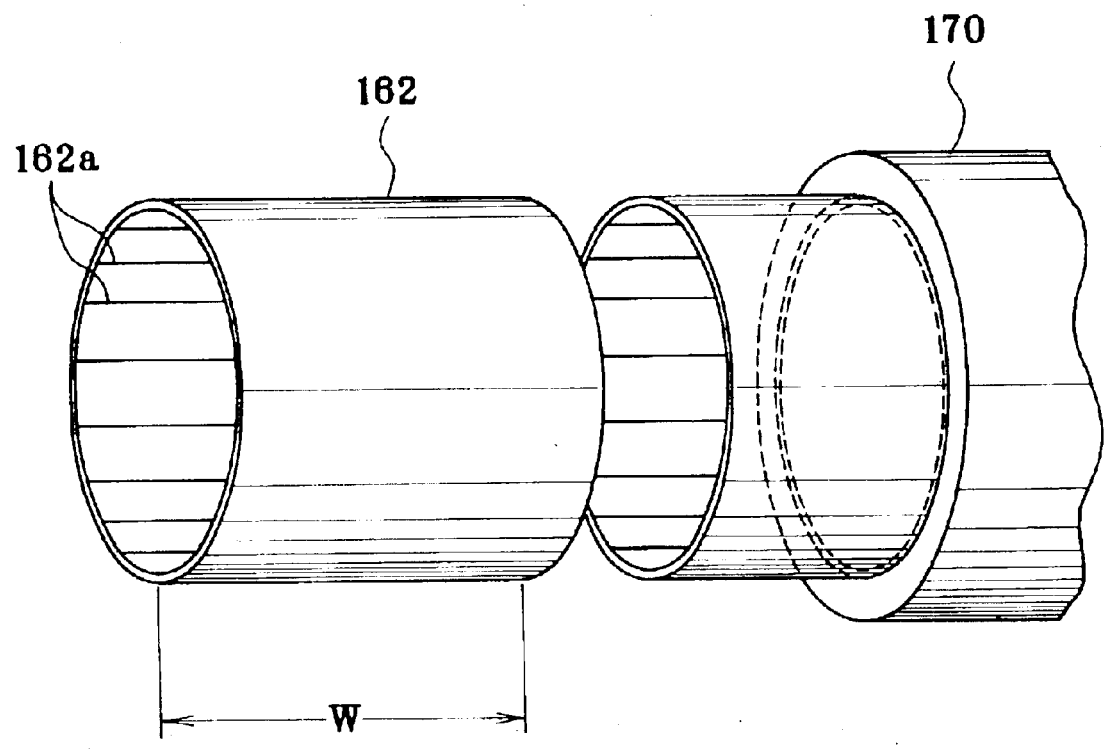
FIG. 9 is an illustration for explaining a process of manufacturing a belt by an extrusion moulding method according to the present invention.

FIG. 9 is an illustration for explaining a process of manufacturing a belt by the extrusion moulding method. A thermoplastic resin is molded by extruding it with a ring die 170 into a cylindrical shape. After the moulding, the extruded article is cut to have a desired width W. In this manner, the belt 162 is manufactured. According to this extrusion moulding, minute groove-like extrusion traces 162a are formed in the inner surface of the belt along the width direction of the same. On the other hand, the roller body 153 shown in FIG. 8 has machining traces (cutting traces or grinding traces) formed along the circumferential direction of the roller.

Therefore, since the extrusion traces 162a extend perpendicularly to the machining traces when the belt 162 is laid around the roller body 153, the extrusion traces 162a and the machining traces do not interfere with each other. This means, the propagation of the biasing force of the slidable flange 157 is not intercepted, thereby reducing the frictional resistance between the back of the belt 162 and the surface of the roller body 153.

Figure 10B:
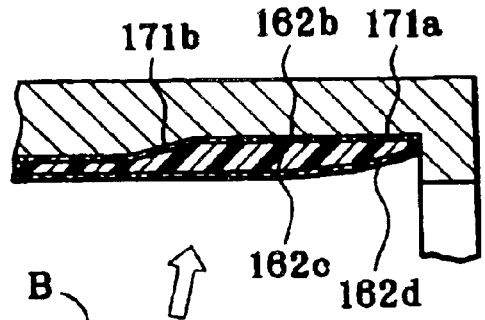
Figure 10A:
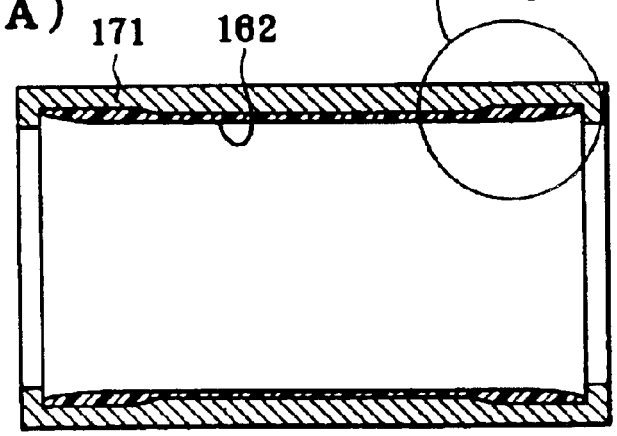
Figure 10C:
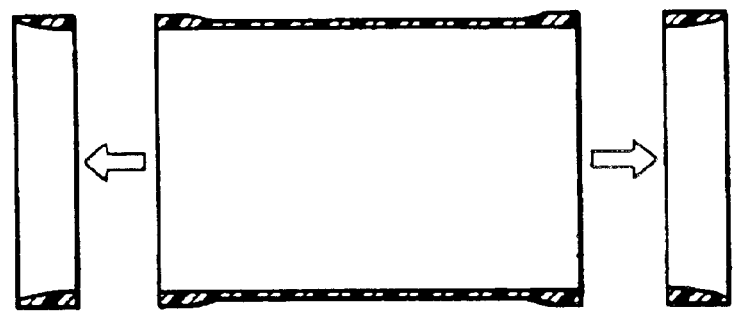
Figure 10D:
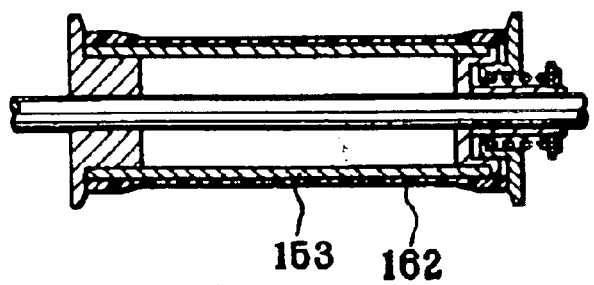

FIGS. 10(A)–10(D) are illustrations for explaining a process of manufacturing a belt by a centrifugal moulding method, wherein FIG. 10(A) is a sectional view generally showing the belt with a mold, FIG. 10(B) is an enlarged sectional view of a portion B of FIG. 10(A), FIG. 10(C) is a sectional view of the belt manufactured, and FIG. 10(D) is a sectional view showing a state that the belt is wrapped around a roller body.

As shown in FIG. 10(A), this method is a method of manufacturing a belt 162 by pouring a liquid resin or liquid rubber material into a cylindrical mold 171 which rotates. Unlike the extrusion moulding, a multi-layered belt can be manufactured by sequentially pouring materials such as resin, rubber, and the like having different properties. In this embodiment, as shown in FIG. 10(B), the belt having three layers is made by sequentially pouring a fluorine content resin 162b for ensuring the cleaning property of the belt surface, an urethane rubber 162c as a core material, and a fluorine content resin 162d making the back of the belt to have lower frictional resistance. At the both side ends of the cylindrical mold 171, large-diameter portions 171a of which diameter is larger than that of the middle portion are formed and tapered portions 171b for allowing smooth flowing of material into the large-diameter portions 171a are formed, thereby facilitating the manufacture of a belt which has side edges thicker than the middle portion. By cutting both sides of the belt manufactured by the centrifugal moulding method as shown in FIG. 10(C), the belt, which can be fitted to the roller body 153 as shown in FIG. 10(D), is obtained.

If the side edges of the belt are formed to be too thick, a warp as mentioned above may be created and crack may be created when driven for a long period of time. Accordingly, the thickness at the side edges of the belt should be twice or less of that at the middle portion of the belt. For example, when the middle portion of the belt is 200 $\mu$m in thickness, the side ends of the belt are 400 $\mu$m or less in thickness.

As apparent from the above description, a meandering prevention mechanism according to this embodiment comprises a roller body around which a transfer belt is wrapped, a pair of retaining flanges arranged on the both ends of the roller body, a flange portion which is formed on one of the retaining flange to project from the outer periphery of the roller body, a slidable flange which is slidably disposed on the other retaining flange, a spring for biasing the slidable flange against the other retaining flange, and a flange portion which is formed on said slidable flange to project from the outer periphery of the roller body. The side edges of the transfer belt are restrained between the flange portion of the one retaining flange and the flange portion of the slidable flange, thereby preventing the meandering of the belt with a simple structure.

Though the present invention has been described with reference to the embodiments disclosed herein, the present invention is not limited thereto and the components of the present invention may be replaced with or include conventionally known or well known techniques.

For example, though the meandering prevention device is arranged in the driven roller 13 shown in FIG. 1 and FIG. 3 in the above embodiment, the meandering prevention device may be arranged in the driving roller 12 and may be arranged in both the rollers. Alternatively, a plurality of driven rollers may be provided and the meandering prevention devices may be arranged in the respective driven rollers. In case of the image forming apparatus shown in FIG. 1 and FIG. 3 in which the diameter of the driven roller 13 is larger than the diameter of the driving roller 12, the meandering prevention mechanism is preferably arranged in the driven roller 13 because the restration is conducted by the retaining flange 151 and the slidable flange 157 of which diameters are larger than those of the driving roller 12 so as to further effectively prevent the meandering.

What we claim is:

1. A transfer belt unit, comprising:
   a transfer belt,
   a plurality of rollers around which the transfer belt is laid with certain tension, wherein at least one of the rollers is a tension roller for tensioning the transfer belt;
   frames supporting the plurality of rollers;
   tensioning mechanisms, disposed on side faces of said frames, to bias said tension roller in a belt tensioning direction;
   cleaning means in contact with the transfer belt at a position opposing said tension roller;
   rotation preventing members preventing rotational torque from being transmitted to said cleaning means; and
   position restricting members restricting the relative position between said cleaning means and said tension roller;
   wherein each of said position restricting members is a plate connecting a cleaner casing of said cleaning means and a stationary shaft of the tension roller.

2. An image forming apparatus comprising image forming stations for respective colors arranged along a transfer belt unit as claimed in claim 1, each image forming station including an image carrier, a charging means and a developing means disposed around said image carrier, wherein the transfer belt is passed through the respective image forming stations, thereby forming a multi-color image.

3. An image forming apparatus as claimed in claim 2, wherein said transfer belt is an intermediate transfer belt.

4. An image forming apparatus as claimed in claim 3, wherein:
   said transfer belt is laid around a driving roller and the tension roller with certain tension,
   said tension roller is disposed obliquely above the driving roller and such that the belt tension side, at the time of driving the transfer belt, is on the lower side, and
   the image carriers of the respective image forming stations are in contact with the transfer belt on the belt tension side.

5. An image forming apparatus as claimed in claim 4, wherein said cleaning means is positioned on said belt tension side.

6. A transfer belt unit comprising:
   a transfer belt,
   a plurality of rollers around which the transfer belt is laid with certain tension, wherein at least one of the rollers is a tension roller for tensioning to the transfer belt;
   frames supporting the plurality of rollers;
   tensioning mechanisms, which are disposed on side faces of said frames, to bias said tension roller in a belt tensioning direction;
   a cleaning means being in contact with the transfer belt at a position opposing said tension roller;
   rotation preventing members which prevents the preventing rotational torque from being transmitted to said cleaning means; and
   position restricting members which restrict restricting the relative position between said cleaning means and said tension roller;
   wherein said tensioning mechanisms comprise:
   an elongate hole formed in each frame and through which a stationary shaft of the tension roller is disposed,
   a turning lever rotatably disposed on the frame and having one end in contact with said stationary shaft, and
   a spring disposed between the other end of the turning lever and the frame.

7. A transfer belt unit comprising:
   a transfer belt,
   a plurality of rollers around which the transfer belt is laid with certain tension, wherein at least one of the rollers is a tension roller for tensioning to the transfer belt;
   frames supporting the plurality of rollers;
   tensioning mechanisms, which are disposed on side faces of said frames, to bias said tension roller in a belt tensioning direction;
   a cleaning means being in contact with the transfer belt at a position opposing said tension roller;
   rotation preventing members which prevents the preventing rotational torque from being transmitted to said cleaning means; and
   position restricting members which restrict restricting the relative position between said cleaning means and said tension roller;
   wherein each of said rotation preventing members comprises:
   a fitting flange formed in one of said frames, extending in the belt tensioning direction, and
   a receiving groove formed in the cleaning means, and fitted with said fitting flange.

8. An image forming apparatus comprising image forming stations for respective colors arranged along a transfer belt unit comprising:
   a transfer belt,
   a plurality of rollers around which the transfer belt is laid with certain tension, wherein at least one of the rollers is a tension roller for tensioning the transfer belt;
   frames supporting the plurality of rollers;
   tensioning mechanisms, disposed on side faces of said frames, to bias said tension roller in a belt tensioning direction;

cleaning means in contact with the transfer belt at a position opposing said tension roller;

rotation preventing members preventing rotational torque from being transmitted to said cleaning means; and position restricting members restricting the relative position between said cleaning means and said tension roller;

wherein each image forming station including an image carrier, a charging means and a developing means disposed around said image carrier;

wherein the transfer belt is passed through the respective image forming stations, thereby forming a multi-color image;

wherein said transfer belt is an intermediate transfer belt;

wherein said transfer belt is laid around a driving roller and the tension roller with certain tension;

wherein said tension roller is disposed obliquely above the driving roller and such that the belt tension side, at the time of driving the transfer belt, is on the lower side, and the image carriers of the respective image forming stations are in contact with the transfer belt on the belt tension side;

wherein said cleaning means is positioned on said belt tension side; and wherein a toner collecting container is arranged along the side surface of one of said frames.

* * * * *